United States Patent [19]
Van Neste et al.

[11] Patent Number: 4,759,864
[45] Date of Patent: Jul. 26, 1988

[54] CORROSION-INHIBITED ANTIFREEZE FORMULATION

[75] Inventors: Walter A. Van Neste, Amandsberg; Jean P. Maes, Merelbeke, both of Belgium; Jerome W. Darden, Irvine, Calif.; Carol A. Triebel, Austin, Tex.

[73] Assignee: Texaco Inc. & S.A. Texaco Petro, N.V., White Plains, N.Y.

[21] Appl. No.: 93,419

[22] Filed: Sep. 4, 1987

[51] Int. Cl.$^4$ ................................................ C09K 5/00
[52] U.S. Cl. ...................................... 252/75; 252/76; 252/79; 252/396
[58] Field of Search ..................... 252/75, 76, 79, 396

[56] References Cited

U.S. PATENT DOCUMENTS

| | | | |
|---|---|---|---|
| 2,832,742 | 4/1958 | Weltman | 252/77 |
| 4,242,214 | 12/1980 | Lambert, Jr. | 252/75 |
| 4,342,596 | 8/1982 | Conner, Sr. | 106/14.27 |
| 4,390,439 | 6/1983 | Schwartz et al. | 252/79 |
| 4,647,392 | 3/1987 | Darden et al. | 252/75 |

FOREIGN PATENT DOCUMENTS 2036062  6/1980  United Kingdom .................. 252/75

Primary Examiner—Robert Wax
Attorney, Agent, or Firm—Robert A. Kulason; James J. O'Loughlin; Louis S. Sorell

[57] ABSTRACT

A corrosion-inhibited antifreeze concentrate formulation containing no phosphate, amine, or nitrite compounds consists essentially of:
(a) a major amount of a water soluble liquid alcohol freezing point depressant;
(b) from 0.1–5.0 weight percent of a $C_6$–$C_{12}$ aliphatic monobasic acid or the alkali metal salt thereof;
(c) from 0.1–5.0 weight percent of an alkali metal borate compound; and
(d) from 0.1–5.0 weight percent of a hydrocarbyl triazole.

The concentrate formulation and aqueous antifreeze formulations of the instant invention give synergistic corrosion protection for a variety of metal surfaces as compared with compositions containing only the aliphatic monobasic acid/salt or alkali metal borate component alone.

10 Claims, No Drawings

CORROSION-INHIBITED ANTIFREEZE FORMULATION

BACKGROUND OF THE INVENTION

1. Field of the Invention

This invention relates to corrosion-inhibited antifreeze concentrate formulations, and to aqueous corrosion-inhibited antifreeze formulations for use in the cooling systems of internal combustion engines. More particularly, this invention relates to a corrosion-inhibited antifreeze concentrate formulation containing no phosphate, nitrite or amine compounds, and consisting essentially of a water soluble liquid alcohol freezing point depressant, a $C_6$–$C_{12}$ aliphatic monobasic acid or alkali metal salt thereof, an alkali metal borate compound, and a hydrocarbyl triazole. The above described corrosion-inhibited antifreeze concentrate formulation and aqueous corrosion-inhibited antifreeze formulations derived via dilution of the concentrate with water provide unexpected synergistic corrosion protection for a variety of metals typically employed in engine cooling systems.

Automobile engine cooling systems contain a variety of metals, including copper, solder, brass, steel, cast iron, aluminum, magnesium, and their alloys. The possibility of corrosive attack on such metals is high, due to both the presence of various ions as well as the high temperatures, pressures, and flow rates found in such cooling systems. The presence of corrosion products within the cooling system can interfere with heat transfer from the engine combustion chambers, which may subsequently cause engine overheating and engine component failure due to excess metal temperatures. See generally Fay, R. H., "Antifreezes and Deicing Fluids," In: *Kirk-Othmer Encyclopedia of Chemical Technology* (1978 ed.) vol. 3, pp. 79–95. It would therefore be advantageous to develop corrosion-inhibited antifreeze formulations to avoid the abovedescribed problems.

A variety of corrosion inhibitors have previously been employed, both alone and in combination, to control the abovedescribed problems. However, many conventional corrosion inhibitors have themselves been found to cause problems when employed in antifreeze formulations. For example, phosphate compounds have been found to be good corrosion inhibitors for cast iron and steel, as well as for aluminum cavitation corrosion. Phosphates have also been employed to maintain the pH of antifreeze formulations.

Nevertheless, attendant problems may result from the use of phosphate compounds. For example, the dilution of an antifreeze formulation containing phosphate corrosion inhibitors with hard water will cause the precipitation of insoluble alkali earth phosphate salts from the aqueous antifreeze solution. This precipitation causes rapid depletion of phosphate in solution, and in turn causes a decrease in corrosion protection within the antifreeze formulation. In addition, the precipitating solids will scale and eventually plug the passages of the engine cooling system, which is detrimental to heat transfer from the engine combustion chambers. The use of phosphate-containing antifreeze formulations is thus precluded in many areas, where only hard water (i.e. water of greater than 150 ppm as $CaCO_3$ total hardness) is available to dilute the antifreeze concentrate. In fact, several European automakers have banned the use of phosphate-containing antifreeze formulations in their automobiles due to the abovedescribed hard water compatibility problems. To circumvent this problem, the use of various anti-precipitation additives in phosphate-containing antifreeze formulations has been proposed, see co-assigned U.S. patent application Ser. No. 834,678 (Triebel et al.), filed on Nov. 28, 1986 (D#80,528). However, the use of such additives increases the overall cost of the formulation.

Other conventional corrosion inhibitors also have problems associated with their use in antifreeze formulations. Amine and nitrite compounds, which are often employed as corrosion inhibitors in antifreeze formulations may form dangerous nitroso compounds when used together. It would therefore be advantageous to develop an antifreeze formulation which provides adequate protection of a variety of metals without employing phosphate, amine, or nitrite compounds.

It is the object of the instant invention to provide a corrosion-inhibited antifreeze concentrate formulation and an aqueous corrosion-inhibited antifreeze formulation containing no phosphate, nitrite, or amine compounds, yet remaining effective in preventing corrosion in a variety of metals. The instant invention provides synergistic corrosion protection for various metals beyond what would ordinarily be expected from the combination of the individual corrosion-inhibiting components of the invention.

2. Information Disclosure Statement

It is well known that various monobasic and dibasic acids are effective as corrosion inhibitors, either alone or in combination with other corrosion inhibitors. For example, the use of sodium salts of various monobasic and dibasic acids as mild steel corrosion inhibitors is disclosed in Hersch, P., et al., "An Experimental Survey of Rust Preventives in Water —II. The Screening of Organic Inhibitors," *Journal of Applied Chemistry*, Vol. 11 (July, 1961), pp. 254–55. Many U.S. and foreign patent references also disclose the use of various monobasic or dibasic acids or salts as corrosion inhibitors. For example:

Co-assigned U.S. patent application Ser. No. 880,473, (Van Neste et al.) filed on June 30, 1986 (D#71,000-TF-150) discloses a corrosion-inhibited antifreeze composition comprising a water soluble liquid alcohol freezing point depressant, an alkyl benzoic acid or salt thereof, a $C_8$–$C_{12}$ aliphatic monobasic acid or salt thereof, and a hydrocarbyl triazole;

Co-assigned U.S. patent application Ser. No. 819,321 (Trievel et al.), filed on Jan. 16,1986 (D#80,502) discloses a stabilized corrosion-inhibited antifreeze formulation which comprises at least one $C_5$–$C_{16}$ monobasic or dibasic acid/salt and a precipitation-inhibiting hydrocarbyl aminophosphonic acid/salt or polyacrylic acid/polyacrylate stabilizer;

Co-assigned U.S. Pat. No. 4,657,689 (Darden) discloses a corrosion-inhibited antifreeze composition comprising a $C_5$–$C_{16}$ aliphatic monobasic acid/salt, a –$C_5C_{16}$ hydrocarbyl dibasic acid/salt, a hydrocarbyl azole, and a hydrocarbyl $C_{10}$–$C_{20}$ alkali metal sulfonate;

Co-assigned U.S. Pat. No. 4,647,392 (Darden et al.) discloses a corrosion-inhibited antifreeze formulation comprising the combination of a $C_5$–$C_{16}$ aliphatic monobasic acid/salt, a $C_5$–$C_{16}$ hydrocarbyl dibasic acid/salt, and a hydrocarbyl triazole;

Co-assigned U.S. Pat. No. 4,588,513 (Triebel et al.) discloses a non-borate and non-phosphate corrosion inhibited antifreeze formulation comprising a dibasic acid or salt, an alkali metal silicate, and a triazole;

Co-assigned U.S. Pat. No. 4,578,205 (Yeakey et al.) discloses a corrosion inhibitor for use in antifreeze formulations which is a combination of the dibasic acid methylene azelaic acid and optional conventional corrosion inhibitors, including alkali metal borates;

Co-assigned U.S. Pat. No. 4,561,990 (Darden) discloses a corrosion inhibitor useful in preventing the corrosion of high lead solders in phosphate-based antifreeze formulations, the inhibitor comprising a $C_8$–$C_{12}$ dicarboxylic acid or salt, an alkali metal molybdate, and optionally containing a conventional corrosion inhibitor such as an alkali metal borate;

U.S. Pat. No. 4,450,088 (Wilson et al.) discloses a corrosion inhibited antifreeze formulation comprising the mixture of an amino acid or derivative thereof, an alkali metal phosphate, a heterocyclic nitrogen compound, and a conventional corrosion inhibitor which may be borax;

U.S. Pat. No. 4,382,008 (Boreland et al.) discloses a corrosion inhibitor for aqueous media comprising a triazole, a benzoate, a silicate, the alkali metal salt of a $C_7$–$C_{13}$ dibasic acid, and an alkali metal borate;

U.S. Pat. No. 4,342,596 (Conner) discloses an aqueous corrosion inhibitor which is a mixture of a $C_8$–$C_{20}$ aliphatic monobasic acid, a lubricant, an amino alkylalkanolamine, an aromatic mono- or polycarboxylic acid, and an amine which forms a water soluble salt with the aromatic acid;

U.S. Pat. No. 3,962,109 (Oberhofer et al.) discloses a cleaner-inhibitor composition for use in automobile cooling systems, the composition comprising an amino polycarboxylic acid, an alpha-hydroxy carboxylic acid, an azole compound, an alkali metal borate, an alkali metal nitrite, and an alkali metal silicate; and U.S. Pat. No. 2,832,742 (Weltman) discloses a water soluble corrosion inhibitor which is a mixture of $C_7$–$C_{18}$ high molecular weight aliphatic carboxylic acids and p-tert butyl benzoic acid;

Many of the abovedescribed references employ borax or alkali metal borate compounds as optional corrosion inhibitors in addition to a monobasic or dibasic acid or salt corrosion inhibitor. However, the instant invention is distinguishable from other compositions employing monobasic or dibasic acids or salts in combination with borax or alkali metal borate compounds in that the instant invention offers synergistic corrosion protection for a variety of metals that is unexpected based upon the individual corrosion-inhibiting performance of monobasic or dibasic acids or salts and borax or alkali metal borate compounds alone.

SUMMARY OF THE INVENTION

The instant invention is directed to a corrosion-inhibited antifreeze concentrate composition and to aqueous corrosion-inhibited antifreeze formulations useful in the cooling systems of internal combustion enginess, where such formulations expressly do not contain phosphate, amine, or nitrite compounds. The corrosion-inhibited antifreeze concentrate of the instant invention consists essentially of:

(a) a major amount, preferably 90–99 weight percent of a water soluble liquid alcohol freezing point depressant, preferably ethylene glycol;

(b) from 0.1–5.0 weight percent, preferably 0.2–3.0 weight percent of a $C_6$–$C_{12}$ aliphatic monobasic acid, preferably octanoic acid or 2-ethylhexanoic acid or the alkali metal salt thereof;

(c) from 0.1–5.0 weight pecent, preferably 0.1–3.0 weight percent of an alkali metal borate compound, preferably sodium tetraborate; and (d) from 0.1–0.5 weight percent, preferably 0.1–0.3 weight percent of a hydrocarbyl triazole, preferably benzotriazole or tolyltriazole.

Additional corrosion inhibitors which may optionally be employed in admixture with the corrosion-inhibited antifreeze concentrate or aqueous antifreeze formulation of the instant invention are alkali metal hydroxides, silicates, nitrates, benzoates, and molybdates, or combinations thereof, in a concentration range of 0.1–5.0 weight percent.

Aqueous non-phosphate corrosion-inhibited antifreeze formulations of the instant invention are those where the antifreeze concentrate of the instant invention is diluted with 10–90 wt. %, preferably 25–75 wt. % of water. The antifreeze concentrate and aqueous antifreeze compositions of the instant invention exhibit a synergistic resistance to corrosion for a variety of metals in comparison with compositions containing either the monobasic acid or salt or alkali metal borate components described above.

DETAILED EMBODIMENTS OF THE INVENTION

The corrosion-inhibited antifreeze concentrate composition of the instant invention contains no phosphate, amine, or nitrite compounds, and consists essentially of:

(a) a major amount of a water soluble liquid alcohol freezing point depressant;

(b) from 0.1–5.0 weight percent of a $C_6$14 $C_{12}$ aliphatic monobasic acid or the alkali metal salt thereof;

(c) from 0.1–5.0 weight percent of an alkali metal borate compound; and (d) from 0.1–0.5 weight percent of a hydrocarbyl azole.

The liquid alcohol freezing point depressant component of the abovedescribed antifreeze concentrate composition may be a glycol or glycol ether. The glycols which may be employed as major components in the instant invention include glycols such as ethylene glycol, diethylene glycol, propylene glycol, dipropylene glycol, and glycol monoethers such as the methyl, ethyl, propyl, and butyl ethers of ethylene glycol, diethylene glycol, propylene glycol, and dipropylene glycol. Ethylene glycol is particularly preferred as the liquid alcohol freezing point depressant component. The abovedescribed liquid alcohol freezing point component of the instant invention is preferably present in a concentration of 90–99 weight percent, based upon the total weight of the concentrate composition.

The alkphatic monobasic acid component of the abovedescribed antifreeze concentrate composition may be any $C_6$–$C_{12}$ aliphatic monobasic acid or the alkali metal salt thereof. This includes one or more of the following acids or isomers thereof: hexanoic, heptanoic, isoheptanoic, octanoic (hereinafter referred to as OA), 2-ethylhexanoic (hereinafter referred to as 2-EHA), nonanoic, decanoic, undecanoic, dodecanoic, and neodecanoic acid. OA and 2-EHA are preferred for use in the instant invention, with 2-EHA being particularly preferred. Any alkali metal may be used to form the monobasic salt; however, sodium and potassium are preferred, with sodium being particularly preferred. The monobasic acid or alkali metal salt component of the instant invention is present in a concentration of 0.1–5.0 weight percent, preferably 0.1–3.0 weight percent, based upon the total weight of the concentrate composition (the weight percent calculated based upon the free acid).

The alkali metal borate component of the abovedescribed antifreeze concentrate composition may be any borax, alkali metal metaborate or alkali metal tetraborate compound; or mixtures thereof. Hydrated Alkali metal tetraborate compounds are particularly preferred, with sodium tetraborate decahydrate and pentahydrate being the most preferred for use in the instant invention. The hydrated alkali metal borate component of the instant invention is present in a concentration of 0.1–5.0 weight percent, preferably 0.1–3.0 weight percent, based upon the total weight of the concentrate composition.

The hydrocarbyl triazole component of the abovedescribed antifreeze concentrate composition is preferably an aromatic triazole or alkyl-substituted aromatic triazole preferably benzotriazole or tolyltriazole. The most preferred hydrocarbyl triazole for use is tolyltriazole (hereinafter referred to as TTZ). The triazole component of the instant invention is present in a concentration of 0.1–0.5 weight percent, preferably 0.1–0.3 weight percent, based upon the total weight of the concentrate composition.

One or more optional conventional corrosion inhibitors may also be employed in admixture with the corrosion-inhibited concentrate of the instant invention so long as this inhibitor contains no phosphate, amine, or nitrite compounds. Such conventional corrosion inhibitors may be selected from the group consisting of alkali metal hydroxides, benzoates, silicates, nitrates and molybdates, and mixtures thereof. Such conventional corrosion inhibitors, if employed, may be present in a concentration of 0.1–5.0 weight percent, based upon the total weight of the concentrate composition.

In the best mode of carrying out the instant invention, the corrosion-inhibited antifreeze concentrate of the instant invention consists essentially of 3.0 weight percent of 2-EHA, 1.3 weight percent sodium tetraborate decahydrate, 0.2 weight percent TTZ, and the remainder of the concentrate being ethylene glycol, with all weight percents based upon the total weight of the concentrate composition.

In another embodiment of the instant invention, the corrosion-inhibited antifreeze concentrate of the instant invention may be diluted with 10–90 weight percent, preferably 25–75 weight percent of water, based upon the total weight of the aqueous composition. Such dilution facilitates use of the instant invention in automobile coolant systems.

The method of the instant invention will be further illustrated by the following examples, which are not intended to limit the invention, but rather to illuminate it.

EXAMPLE 1
(COMPARATIVE EXAMPLE)

An antifreeze concentrate formulation was prepared consisting of a major amount of ethylene glycol, 1.3 wt. % sodium tetraborate decahydrate (borax), and 0.2 wt. % TTZ.

EXAMPLE 2
(COMPARATIVE EXAMPLE)

An antifreeze concentrate formulation was prepared consisting of a major amount of ethylene glycol, 3.0 wt. % 2-EHA, and 0.2 wt. % TTZ.

EXAMPLE 3
(INSTANT INVENTION)

In the best mode of practicing the instant invention, an antifreeze concentrate formulation was prepared consisting of a major amount of ethylene glycol, 1.3 wt. % sodium tetraborate decahydrate (borax), 3.0 wt. % 2-EHA, and 0.2 wt. % TTZ.

EXAMPLE 4
(COMPARATIVE EXAMPLE)

An antifreeze concentrate formulation was prepared consisting of a major amount of ethylene glycol, 3.0 wt. % sebacic acid (SA), and 0.2 wt. % TTZ.

EXAMPLE 5
(COMPARATIVE EXAMPLE)

An antifreeze concentrate formulation was prepared consisting of a major amount of ethylene glycol, 1.3 wt. % sodium tetraborate decahydrate (borax), 3.0 wt. % SA, and 0.2 wt. % TTZ.

EXAMPLE 6
(INSTANT INVENTION)

An antifreeze concentrate formulation was prepared consisting of a major amount of ethylene glycol, 1.0 wt. % sodium tetraborate pentahydrate (borax), 0.58 wt. % sodium octanoate (the sodium salt of octanoic acid), 2.0 wt. % sodium benzoate, 0.2 wt. % sodium nitrate, 0.18 wt. % sodium silicate, and 0.23 wt. % TTZ.

EXAMPLE 7
(COMPARATIVE EXAMPLE)

An antifreeze concentrate formulation was prepared consisting of a major amount of ethylene glycol, 1.0 wt. % sodium tetraborate pentahydrate, 0.58 wt. % sodium sebacate (the sodium salt of sebacic acid), 2.0 wt. % sodium benzoate, 0.2 wt. % sodium nitrate, 0.18 wt. % sodium silicate, and 0.23 wt. % TTZ.

It is well known that the corrosion resistance of a metal or alloy depends upon both the stability of its passivating oxide protective film and its ability to repassivate active corrosion regions on the surface of the metal or alloy. A Rapid Cyclic Potentiokinetic Polarization Scanning (RCP) technique, based on cyclic potentiokinetic polarization and described in the CEBELCOR (Centre Belge d'Etude de la Corrosion) publication *Rapports Techniques*, Vol. 147, R. T. 272 (Aug. 1984), may be used to determine the susceptibility of a metal or alloy to localized corrosion. The RCP technique measures borth rupture or pitting potential ($E_R$) and repassivation potential ($E_P$) for a given metal or alloy. $E_R$ is the potential at which the passivating film of a given material breaks down, and is directly related to the pitting tendency of the material in a particular environment. $E_P$ is the potential at which active corrosion regions of the material are repassivated in a given environment. $E_R$ and $E_P$ values are measured with a silver reference electrode and a working electrode constructed from the material subject to corrosive attack. The higher (more positive) the $E_R$ value, the more effective a given antifreeze formulation is in preventing pitting corrosion initiation and progress. Similarly, a higher (more positive) $E_P$ value indicates that the particular corrosion inhibitor formulation has a greater ability to repassivate existing pits and crevices.

The RCP test procedure may be described as follows: polished specimens of the metal to be tested (working electrode) are immersed in a 30% by volume solution of a given antifreeze concentrate formulation in hard ASTM corrosive water; that is, water containing 148 mg/l of sodium sulfate, 165 mg/l of sodium chloride, 138 mg/l of sodium bicarbonate (ASTM D1384 corrosive water), and in addition 275 mg/l of calcium chloride. Polarization is achieved by polarizing at a scan rate of 2 mv/second until the rupture potential $E_R$ is attained. A rapid increase in polarizing current results at $E_R$ as the protective passivating film breaks down. When the current reaches a predetermined maximum value, the scanning direction is reversed towards more cathode potentials. The repassivation potential $E_P$ is determined during this final phase of the RCP scan.

Table I sets forth $E_R$ and $E_P$ values obtained via the RCP technique for Examples 1–5. Electrode potentials are shown for various metals for an antifreeze concentrate containing only the conventional corrosion inhibitors sodium tetraborate and TTZ (Example 1), an antifreeze concentrate containing only the monobasic acid corrosion inhibitor 2-EHA and TTZ (Example 2), and an antifreeze concentrate of the instant invention containing the combination of the corrosion inhibitors sodium tetraborate, 2-EHA, and TTZ (Example 3). The synergistic corrosion protection afforded by the instant invention for the various metals is clearly shown by Table I, as $E_P$ and $E_R$ values for the instant invention are greater than the merely additive contributions of sodium tetraborate and 2-EHA.

In addition, Table I sets forth $E_R$ and $E_P$ values for an antifreeze concentrate containing the dibasic acid corrosion inhibitor sebacic acid (SA) and TTZ (Example 4), and an antifreeze concentrate containing the combination of the corrosion inhibitors sodium tetraborate, TTZ, and SA (Example 5). In contrast with the antifreeze concentrate composition of the instant invention, no synergistic corrosion inhibiting effect was observed in the combination of the corrosion inhibitors sodium tetraborate, TTZ, and SA (Example 5).

TABLE I

RCP MEASUREMENTS TO DETERMINE CORROSION INHIBITOR EFFECTIVENESS ($E_R$ and $E_P$ in mv)*

| | Working Electrode | | | | | | | | | |
|---|---|---|---|---|---|---|---|---|---|---|
| | Aluminum | | Copper | | Solder | | Lead | | Steel | |
| Example | $E_R$ | $E_P$ | $E_R$ | $E_P$ | $E_R$ | $E_P$ | $E_R$ | $E_P$ | $E_R$ | $E_P$ |
| 1 | −400 | −620 | +1000 | +110 | −90 | −320 | +200 | −200 | −40 | −250 |
| 2 | +260 | −520 | +1800 | +200 | +1100 | +900 | +340 | 0 | +640 | +635 |
| 3 | +1480 | −80 | +1800 | +3000 | +1280 | +1180 | +1030 | +980 | +640 | +660 |
| 4 | +140 | −630 | +1800 | +3000 | +1160 | +1100 | +1200 | +1060 | +700 | +670 |
| 5 | +280 | −590 | +1800 | +2900 | +1120 | +1080 | +1070 | +870 | +610 | +650 |

*Electrode potentials at 50 uA/cm²

The corrosion behavior of an antifreeze concentrate of the instant invention comprising sodium octanoate (the sodium salt of octanoic acid), TTZ, borax, and conventional corrosion inhibitors (Example 6), as well as a comparative example of an antifreeze concentrate similar to Example 6 but comprising the sodium salt of sebacic acid in lieu of octanoic acid (Example 7) were also tested according to the ASTM D-1384 Glassware Corrosion Test, incorporated herein by reference. Table II sets forth the results obtained. The smaller the weight loss of the metal coupon, the greater the localized corrosion inhibiting properties of a particular formulation. A negative weight loss signifies a weight increase due to the formation of a protective coating on the coupon. As illustrated by Table II, the antifreeze concentrate formulation of the instant invention (Example 6) demonstrated excellent corrosion protection for a variety of metals, and in addition was superior to the comparative sodium sebacate-borax-TTZ formulation (Example 7) in terms of high lead solder corrosion protection. This is particularly important in view of the fact that high lead solders are increasingly being employed in automotive cooling systems due to lower cost and energy savings.

TABLE II

ASTM D-1384 GLASSWARE CORROSION TEST
wt. loss (mg/coupon)

| Example | Cu | High lead Solder* | Brass | Solder** | Steel | Fe | Al |
|---|---|---|---|---|---|---|---|
| 6 | 3 | 54 | 2 | −2 | 0 | −1 | 1 |
| 7 | 3 | 100 | 2 | −1 | 0 | −1 | 1 |
| ASTM spec., (maximum) | 10 | — | 10 | 30 | 10 | 10 | 30 |

*95% lead/5% tin
**70% lead/30% tin

It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

The invention claimed is:

1. A corrosion-inhibited antifreeze composition for use in the cooling system of a water cooled internal combustion engine, containing no phosphate, amine, or nitrite compounds, and consisting essentially of:
   (a) a major amount of a water soluble liquid alcohol freezing point depressant;
   (b) from 0.1–5.0 weight pecent of a $C_6$–$C_{12}$ aliphatic monobasic acid or the alkali metal salt thereof;
   (c) from 0.1–5.0 weight percent of an alkali metal borate compound; and
   (d) from 0.1–0.5 weight percent of a hydrocarbyl triazole.

2. The corrosion-inhibited antifreeze concentrate composition of claim 1, wherein the liquid alcohol freezing point depressant component is ethylene glycol.

3. The corrosion-inhibited antifreeze concentrate composition of claim 1, where the aliphatic monobasic acid component is selected from the group consisting of hexanoic, heptanoic, isoheptanoic, octanoic, 2-ethylhexanoic, nonanoic, decanoic, undecanoic, dodecanoic, and neodecanoic acid, present in a concentration range of 0.2–3.0 weight percent.

4. The corrosion-inhibited antifreeze concentrate composition of claim 1, where the alkali metal borate component is sodium tetraborate, present in a concentration range of 0.1–3.0 weight percent.

5. The corrosion-inhibited antifreeze concentrate composition of claim 1, where the hydrocarbyl triazole component is tolyltriazole or benzotriazole, present in a concentration range of 0.1–0.3 weight percent.

6. The corrosion-inhibited antifreeze concentrate composition of claim 1, where additional corrosion inhibitors selected from the group consisting of alkali metal hydroxides, benzoates, silicates, nitrates, and molybdates, or combinations thereof, are employed at concentrations of 0.1–5.0 weight percent.

7. A corrosion-inhibited antifreeze concentrate composition for use in the cooling system of a water cooled internal combustion engine, containing no phosphate, amine, or nitrite compounds, and consisting essentially of:
 (a) from 90–99 weight percent of ethylene glycol;
 (b) from 0.2–3.0 weight percent of octanoic acid or the alkali metal salt thereof;
 (c) from 0.1–3.0 weight percent of sodium tetraborate; and
 (d) from 0.1–0.3 weight percent of tolyltriazole.

8. A corrosion-inhibited antifreeze concentrate composition for use in the cooling system of a water cooled internal combustion engine, containing no phosphate, amine, or nitrite compounds, and consisting essentially of:
 (a) from 90–99 weight percent of ethylene glycol;
 (b) from 0.2–3.0 weight percent of 2-ethylhexanoic acid or the alkali metal salt thereof;
 (c) from 0.1–3.0 weight percent of sodium tetraborate; and
 (d) from 0.1–0.3 weight percent of tolyltriazole.

9. The corrosion-inhibited antifreeze concentrate composition of any of claims 1–8, where the antifreeze concentrate composition is diluted with from 10–90 weight percent of water.

10. The corrosion-inhibited antifreeze concentrate composition of any of claims 1–8, where the antifreeze concentrate composition is diluted with from 25–75 weight percent by water.

* * * * *